United States Patent [19]
Nishihata et al.

[11] Patent Number: 5,554,723
[45] Date of Patent: Sep. 10, 1996

[54] PROCESS FOR PRODUCTION OF POLY(ARYLENE THIOETHER) CONTAINING PHTHALIC ANHYDRIDE GROUPS

[75] Inventors: Naomitsu Nishihata; Shunzo Endo; Yukio Ichikawa; Takayuki Katto, all of Iwaki, Japan

[73] Assignee: Kureha Kagaku Kogyo K.K., Tokyo, Japan

[21] Appl. No.: 35,342

[22] Filed: Mar. 19, 1993

[30] Foreign Application Priority Data

Mar. 27, 1992 [JP] Japan ................................ 4-101639

[51] Int. Cl.$^6$ ................................................... C08G 75/14
[52] U.S. Cl. ................................................ 528/388; 525/537
[58] Field of Search ............................. 528/388; 525/537

[56] References Cited

U.S. PATENT DOCUMENTS

| | | | |
|---|---|---|---|
| 4,605,732 | 8/1986 | Heitz et al. | 528/388 |
| 4,645,826 | 2/1987 | Iizuka | 528/388 |
| 5,256,763 | 10/1993 | Hoshino et al. | 528/364 |

FOREIGN PATENT DOCUMENTS

| | | |
|---|---|---|
| 0053344A1 | 11/1981 | European Pat. Off. . |
| 0164638A3 | 5/1985 | European Pat. Off. . |
| 0166368A2 | 1/1986 | European Pat. Off. . |
| 0259984A1 | 8/1987 | European Pat. Off. . |
| 0256757A1 | 8/1987 | European Pat. Off. . |
| 0394933A2 | 10/1990 | European Pat. Off. . |
| 0494518A2 | 5/1992 | European Pat. Off. . |
| 61-7249 | 1/1986 | Japan . |
| 63-305131 | 12/1988 | Japan . |
| 2-283763 | 11/1990 | Japan . |
| 4-18422 | 1/1992 | Japan . |

*Primary Examiner*—Marion E. McCamish
*Assistant Examiner*—Helen F. Lee
*Attorney, Agent, or Firm*—Lowe, Price, LeBlanc & Becker

[57] ABSTRACT

A process for the production of a poly(arylene thioether) containing phthalic anhydride groups wherein a dihalogen-substituted aromatic compound is reacted with an alkali metal sulfide in a polar organic solvent containing water to produce the poly(arylene thioether) is disclosed. This process comprises causing a monohalogen-substituted phthalic compound to exist in a polymerization reaction system, and controlling a ratio, a/b of the number of moles, a of the charged dihalogen-substituted aromatic compound to the number of moles, b of the charged alkali metal sulfide within a range of $0.8 < a/b < 1$.

2 Claims, 2 Drawing Sheets

PROCESS FOR PRODUCTION OF POLY(ARYLENE THIOETHER) CONTAINING PHTHALIC ANHYDRIDE GROUPS

FIELD OF THE INVENTION

The present invention relates to a process for the production of a poly(arylene thioether) containing phthalic anhydride groups, and more specifically to a process for the production of a poly(arylene thioether) containing phthalic anhydride groups, which can provide the polymer as a high-molecular weight polymer in the form of granules.

BACKGROUND OF THE INVENTION

Poly(arylene thioethers) (hereinafter may be abbreviated as "PATEs") represented by poly(phenylene sulfide) (hereinafter may be abbreviated as "PPS") are known as polymers which have a high melting point and are excellent in heat resistance and mechanical properties. In particular, a PATE obtained by subjecting an alkali metal sulfide and a dihalogen-substituted aromatic compound to polymerization under two-step heating in the presence of water in an amount specifically controlled in an organic amide solvent can be provided as a high-molecular weight polymer in the form of granules (U.S. Pat. No. 4,645,826; EP 166368).

However, PATEs commonly used involve problems of their insufficient compatibility with polymers of different kinds and poor adhesion properties to other materials such as metals. It has therefore been proposed to introduce various kinds of functional groups into PATE molecules so as to overcome these problems. PATEs with functional groups introduced thereinto can also be further converted into various modifications or derivatives by using the functional groups.

For example, Japanese Patent Application Laid-Open No. 305131/1988 has proposed a production process of a copolymer having functional groups, in which dihalogen-substituted aromatic carboxylic acid such as dichlorobenzoic acid or an alkali metal salt thereof, a dihalogen-substituted aromatic compound and an alkali metal sulfide are polymerized in the presence of a polar solvent substantially free of any water. However, this process can provide a copolymer only in the form of powder and hence involves problems of difficulties in separation and purification of the copolymer from a reaction system upon its production, and of deterioration in weighability and handling properties of the copolymer and of environmental worsening due to flying of the fine powder upon its forming or molding and processing. In addition, it is difficult for such a process to provide any polymer having a sufficiently high molecular weight.

Japanese Patent Application Laid-Open No. 7249/1986 discloses a process for the production of a PATE containing at least one functional end group, in which a PATE with disulfide introduced into its main chain is prepared and the resulting PATE is then reacted with a reducing agent in the presence of a monofunctional compound. However, it is difficult for this process to provide any polymer high in molecular weight because the cutting of molecular chain is conducted. The melting point of the resulting polymer is also somewhat low.

Japanese Patent Application Laid-Open No. 283763/1990 discloses a resin composition containing a modified PPS obtained by reacting a carboxylic anhydride with a poly(phenylene sulfide) resin. More specifically, this modification reaction is carried out by a process wherein PPS powder is dry-blended with the carboxylic anhydride, and the resultant blend is then melted and kneaded in an extruder controlled at 290°–310° C. and then pelletized. However, when the modified PPS obtained by this process is subjected to a melt-extracting treatment in a solvent such as N-methyl-2-pyrrolidone (hereinafter may be abbreviated as "NMP"), the carboxylic acid component contained in the polymer is lost. Therefore, it can not be said that the PPS is strongly bonded to the carboxylic anhydride.

Japanese Patent Application Laid-Open No. 18422/1992 discloses a process for the production of a PATE with carboxyl groups or carboxylic anhydride groups introduced thereinto, in which a PATE with constituent units consisting of aminobenzene introduced into its main chain is prepared and the resulting PATE is then reacted with a carboxylic acid halide. According to this process, a polymer having a relatively high molecular weight can be obtained. However, since functional groups are introduced into the main chain of the polymer, not on the terminals thereof, the crystallinity of the polymer is reduced, so that the polymer tends to lower its heat resistance.

As described above, it is desirable that when a PATE containing functional groups therein is to be formed or molded either by itself or in the form of a mixture with another polymer, it should be in the form of granules easy to handle, not in the form of powder. According to the conventionally-known processes, however, any resulting polymers tend to become finer as the contents of the functional groups in the polymers increase.

On the other hand, when a dihalogen-substituted aromatic carboxylic acid, a dihalogen-substituted aromatic compound and an alkali metal sulfide are reacted with one another in the presence of an alkaline earth metal compound, a PATE copolymer containing carboxyl groups or their metal salts therein can be produced (EP 494518; CA 2,056,332, which were prior applications filed by the present assignee). According to this process, a PATE copolymer containing functional groups can be obtained in the form of granules. However, the use of an alkaline earth metal compound is essential to this process. In addition, the resulting copolymer tends to have somewhat insufficient heat stability with respect to the functional groups contained therein.

Accordingly, if a granular PATE having a high molecular weight and containing functional groups, which are good in heat resistance, such as a carboxyl group, can be prepared by a simple process, the application fields of PATEs become advantageously wider.

OBJECTS AND SUMMARY OF THE INVENTION

It is an object of this invention to provide a process for the production of a poly(arylene thioether) containing phthalic anhydride groups which are good in heat resistance and hence do not undergo reduction in the effect of the functional groups due to decarboxylation or the like even at the processing temperature of the polymer.

It is also another object of this invention to provide a process for the production of a granular poly(arylene thioether) having a high molecular weight and containing phthalic anhydride groups therein.

The present inventors have carried out an extensive investigation with a view toward overcoming the above-described problems involved in the prior art. As a result, it has been found that when upon the polymerization reaction of a dihalogen-substituted aromatic compound with an alkali metal sulfide in a polar organic solvent containing water to produce a poly(arylene thioether), a monohalogen-substituted phthalic compound is caused to exist in a polymerization system, and a molar ratio of the amount of the charged dihalogen-substituted aromatic compound to the amount of the charged alkali metal sulfide is controlled within a specific range, a poly(arylene thioether) containing phthalic anhydride groups which are excellent in heat resistance and hence do not decompose even at the processing temperature of the polymer can be obtained.

In this case, a granular polymer can be obtained with ease so long as the polymerization reaction mixture is controlled so as to become a state of liquid-liquid phase separation before completion of the polymerization reaction. According to the present invention, a poly(arylene thioether) having a high molecular weight and containing phthalic anhydride groups therein can be obtained.

The present invention has been led to completion on the basis of these findings.

According to the present invention, there is thus provided a process for the production of a poly(arylene thioether) containing phthalic anhydride groups wherein a dihalogen-substituted aromatic compound is reacted with an alkali metal sulfide in a polar organic solvent containing water to produce the poly(arylene thioether), which comprises causing a monohalogen-substituted phthalic compound to exist in a polymerization reaction system, and controlling a ratio, a/b of the number of moles, a of the charged dihalogen-substituted aromatic compound to the number of moles, b of the charged alkali metal sulfide within a range of $0.8 < a/b < 1$.

DETAILED DESCRIPTION OF THE INVENTION

Figure 1:
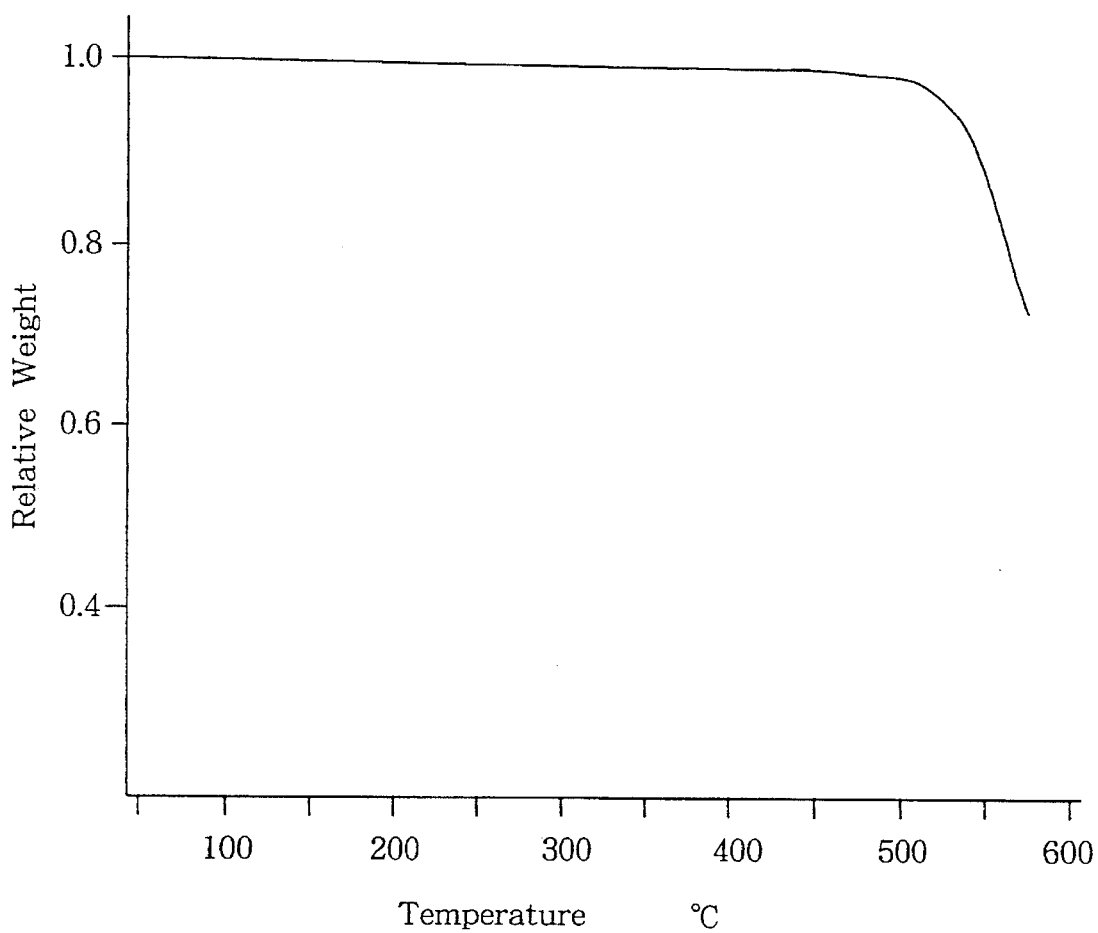
FIG. 1 is a diagram illustrating the results of thermogravimetric analysis on Polymer A obtained in Example 1.

Features of the present invention will hereinafter be described in detail.

Dihalogen-substituted Aromatic Compound

As examples of the dihalogen-substituted aromatic compound useful in the practice of this invention, may be mentioned dihalogen-substituted benzenes such as p-dihalobenzenes and m-dihalobenzenes; dihalogen-substituted alkylbenzenes such as 2,3-dihalotoluenes, 2,4-dihalotoluenes, 2,6-dihalotoluenes, 3,4-dihalotoluenes and 2,5-dihalo-p-xylenes; dihalogen-substituted arylbenzens such as 1-phenyl-2,5-dihalobenzenes; dihalogen-substituted biphenyls such as 4,4'-dihalobiphenyls; dihalogen-substituted naphthalenes such as 2,6-dihalonaphthalenes and 1,5-dihalonaphthalenes; and the like.

Halogen elements in these dihalogen-substituted aromatic compounds may be fluorine, chlorine, bromine or iodine and may be identical or different from each other.

Among the above-mentioned dihalogen-substituted aromatic compounds, dihalogen-substituted benzenes are preferred with p-dichlorobenzene being particularly preferred. In the present invention, these dihalogen-substituted aromatic compounds may be used either singly or in any combination thereof. Dihalogen-substituted aromatic compounds other than the above-mentioned compounds may also be used in combination as a minor component.

In this invention, a trihalogen-substituted benzene, dihalogen-substituted aniline or the like may also be used in combination as another minor component for the modification of molecular weight of the resulting polymer and the like, as needed.

Monohalogen-substituted Phthalic Compound

As examples of the monohalogen-substituted phthalic compound useful in the practice of this invention, may be mentioned 4-halophthalic acids, 3-halophthalic acids and substituted phthalic derivatives with a halophenyl, halophenoxy, halophenylthio, halobenzenesulfonyl, halobenzenesulfinyl, halobenzyl, 2-halophenyl-2-propyl group or the like substituted on phthalic acid.

The monohalogen-substituted phthalic compound used in this invention may also be used in the form of a salt with an alkali metal or alkaline earth metal (a monometal phthalate or dimetal phthalate).

Halogen elements in these monohalogen-substituted phthalic compounds may be fluorine, chlorine, bromine or iodine.

In this invention, these monohalogen-substituted phthalic compounds may be used either singly or in any combination thereof. Among these monohalogen-substituted phthalic compounds, sodium hydrogen chlorophthalate, disodium chlorophthalate and chlorophthalic acid are particularly preferred.

Alkali Metal Sulfide

As exemplary alkali metal sulfides to be used in the present invention, may be mentioned lithium sulfide, sodium sulfide, potassium sulfide, rubidium sulfide and cesium sulfide. These alkali metal sulfides can be used in anhydrous forms, or as hydrates or aqueous mixtures. In addition, an alkali metal sulfide prepared in situ from an alkali metal hydrosulfide may also be used. These alkali metal sulfides may be used either singly or in any combination thereof.

Polar Organic Solvent

The polar organic solvent to be used in the present invention is preferably an aprotic polar solvent stable to alkali at a high temperature.

As specific examples of the polar organic solvent, may be mentioned amide compounds such as N,N-dimethylformamide and N,N-dimethylacetamide; N-alkyl- or N-cycloalkyl-lactams such as N-methyl-ε-caprolactam, N-methyl-2-pyrrolidone and N-cyclohexylpyrrolidone; N,N-dialkylimidazolidinone compounds such as 1,3-dimethyl-2-imidazolidinone; tetraalkylureas such as tetramethylurea; hexaalkylphosphoric triamides such as hexamethylphosphoric triamide; and the like. These solvents may be used either singly or in any combination thereof.

Polymerization Process

In this invention, a process in which the alkali metal sulfide and the dihalogen-substituted aromatic compound are subjected to a polymerization reaction in the polar organic solvent containing water is used as a basic polymerization process. In this case, the monohalogen-substituted phthalic compound is caused to exist in the polymerization reaction system, and a ratio, a/b of the number of moles, a of the charged dihalogen-substituted aromatic compound to the number of moles, b of the charged alkali metal sulfide is controlled within a range of 0.8<a/b<1. If a/b is not greater than 0.8, it is difficult to provide any polymer having a high molecular weight. If a/b is not smaller than 1 on the other hand, it is difficult to introduce phthalic groups into the polymer.

The monohalogen-substituted phthalic compound is generally used in a range of 0.05–30 mole%, preferably 0.1–25 mole % of the total amount of the dihalogen-substituted aromatic compound and the monohalogen-substituted phthalic compound. If the amount of the monohalogen-substituted phthalic compound to be used is lower than 0.05 mole %, the effect of the phthalic groups introduced into the resulting polymer becomes insufficient. To the contrary, any amounts exceeding 30 mole % make it difficult to provide any polymer having a high molecular weight, and moreover reduce the yield of the polymer in the form of granules. Therefore, it is not preferable to use the monohalogen-substituted phthalic compound outside the above-described range.

The total amount of the dihalogen-substituted aromatic compound and the monohalogen-substituted phthalic compound per mole of the alkali metal sulfide is generally in a range of 0.81–1.42 moles, preferably 0.83–1.40 moles. Any total amounts outside this range are not preferable because it is difficult to provide any polymer having a high molecular weight.

No particular limitation is imposed on the amount of the polar organic solvent to be used. However, it is generally used in such a range that the number of moles (total moles) of the combined amount of the dihalogen-substituted aromatic compound and the monohalogen-substituted phthalic compound per kg of the polar organic solvent is 0.1–5 moles, preferably 0.5–3.5 moles.

In the present invention, the polymerization reaction is conducted in the polar organic solvent containing water. The water content is generally in a range of 0.5–30 moles, preferably 1–25 moles per kg of the polar organic solvent. A portion of this water may be added in the course of the polymerization reaction. When the alkali metal sulfide is used in the form of a hydrate, the water content may also be controlled by conducting a dehydration operation by azeotropic distillation or the like, as needed. Any water contents less than 0.5 mole or higher than 30 moles per kg of the polar organic solvent involve a potential problem that an undesirable side reaction or the like tends to occur, and make it difficult to obtain a high-molecular weight polymer.

In this invention, the monohalogen-substituted phthalic compound may be optionally added to the reaction system at any time. For example, there are processes wherein (1) the monohalogen-substituted phthalic compound is charged together with the dihalogen-substituted aromatic compound in the reaction system containing the alkali metal sulfide to start polymerizing, (2) the alkali metal sulfide and the dihalogen-substituted aromatic compound are first charged to start polymerizing, and the monohalogen-substituted phthalic compound is then added, and (3) these processes are combined with each other. The introduction of the phthalic groups becomes comparatively easier when the monohalogen-substituted phthalic compound is added earlier.

For example, in the case where the monohalogen-substituted phthalic compound is added to the reaction system in a state that it has been dissolved in water, a basic compound may also be added to the solution if desired. In order to keep the system alkaline, the basic compound may be added to the polymerization reaction system to conduct the polymerization reaction.

As such a basic compound, may be mentioned at least one compound selected from the hydroxides and oxides of alkali metals and alkaline earth metals.

The polymerization reaction is usually carried out at a temperature ranging generally from 150° to 300° C., preferably from 180° to 280° C. for generally 0.5–30 hours, preferably 1–20 hours in an inert gas atmosphere such as nitrogen or argon. If the reaction temperature is too low, there is a potential problem that the polymerization reaction may become insufficient. If the reaction temperature is too high on the contrary, there is a potential problem that a decomposition reaction may occur. If the polymerization time is too short, there is a potential problem that the polymerization reaction may become insufficient. On the other hand, if the polymerization time is too long, the productivity becomes deteriorated.

The polymerization reaction may also be conducted by heating up the reaction mixture in two or more multi-steps. According to this process, a polymer having a higher molecular weight can be obtained in a shorter period of time. There is, for example, a process in which a preliminary polymerization is conducted at a temperature not higher than 235° C., and a final polymerization is carried out with the reaction mixture heated up to 240° C. or higher. In particular, according to a two-step watering polymerization process wherein when the reaction mixture is heated up to 240° C. or higher at the final stage in the two-step polymerization reaction, water is added before or after the heating, a polymer higher in molecular weight and far excellent in melt stability can be obtained with ease.

As such a two-step watering polymerization process, it is preferable to conduct a polymerization reaction in the following at least two steps in accordance with the production process of a high-molecular weight PATE, which has been disclosed in U.S. Pat. No. 4,645,826 (EP 166368).

First step (preliminary polymerization):

A reaction is conducted in the presence of water in a proportion of 0.5–2.4 moles per mole of the charged alkali metal sulfide at a temperature of 150°–235° C., preferably 180°–235° C. until a conversion upon polymerization becomes 50–98 mole %.

Second step (final polymerization):

Water is added in such a manner that the water content becomes 2.0–7.0 moles, preferably 2.5–7.0 moles per mole of the charged alkali metal sulfide, and the reaction mixture is heated up to a temperature of 240°–300° C., preferably 245°–280° C. to continue the polymerization reaction.

Incidentally, the conversion upon polymerization in the first step is based on the conversion of the dihalogen-substituted aromatic compound. With respect to the molecular weight of the resulting polymer, when the monohalogen-substituted phthalic compound is also added at the time water is added upon the start of the second step, the polymer can be more easily provided as a polymer having a high molecular weight though it varies according to the amount of the monohalogen-substituted phthalic compound to be added. According to this two-step polymerization process, a granular polymer can also be obtained with ease.

In this invention, it is preferable from the viewpoint of the provision of a granular polymer that the polymerization reaction mixture in the polymerization reaction system should be in a state of liquid-liquid phase separation before completion of the polymerization reaction. The term "state of liquid-liquid phase separation" as used herein means that a polymer-rich solution containing a great amount of a polymer formed with the progress of polymerization and a polymer-poor solution high in solvent concentration coexist with each other in the form of a liquid, but separate from each other.

The state of liquid-liquid phase separation occurs when the solvency of the polar organic solvent for the polymer is low in the polymerization reaction system for PATE in the polar organic solvent. Therefore, the mixing of water with the polar organic solvent is a preferred embodiment in the process of the present invention because the solvency of polar organic solvents is reduced in many cases when water is mixed therewith. The addition of an alkali metal carboxylate such as lithium acetate, sodium acetate or sodium benzoate as a polymerization aid to the polymerization reaction system also can make it easy to form the state of liquid-liquid phase separation. The yield of a granular polymer is also increased effectively.

A state in which individual phases divided into at least two phases are all liquid (the state of liquid-liquid phase separation) can be created by raising the temperature of the polymerization reaction system to a temperature at which a phase containing the polymer becomes liquid. In general, the state of liquid-liquid phase separation is created by raising the temperature of the polymerization reaction system to a temperature, at which a melt phase of the polymer is formed, or higher in the course of heating the system through the preliminary polymerization into the final polymerization.

The measurement of the temperature at which the individual phases separated become liquid can be conducted, for example, by charging a mixture having the same composition as the polymerization reaction system into a pressure glass tube to heat it, observing the individual phases with the naked eye until they become liquid, and measuring the temperature of that time. Alternatively, the temperature can be known by using a pressure glass crucible, for example, in a differential scanning calorimeter (DSC) manufactured by Perkin Elmer Company.

This temperature varies according to the kind and polymerization degree of a PATE to be synthesized, and the concentration of the polymer in the solvent. However, it is preferable that the temperature should be at least 230° C., for example, in the case where the polymer to be synthesized is a PATE composed principally of poly(phenylene sulfide) and the system is an NMP system.

After completion of the polymerization reaction, a PATE containing phthalic groups is formed. The phthalic groups generally exist in the form of an acid or metal salt thereof. If the phthalic groups exist in the form of a metal salt, the polymer is treated with acidic water to convert the groups in the form of an acid and the phthalic groups are dehydrated, whereby such groups can be converted into phthalic anhydride groups. In this case, the dehydration may be carried out by the drying treatment of the polymer.

PATE Containing Phthalic Anhydride Groups

According to the present invention, a PATE containing phthalic anhydride groups and having a melt viscosity of generally at least 30 poises, preferably at least 100 poises, more preferably at least 300 poises as measured at 310° C. and a shear rate of 1200 $sec^{-1}$ can be obtained.

The amount of the phthalic anhydride groups contained in the phthalic anhydride group-containing PATE according to this invention is generally at least 2%, preferably at least 3% in terms of an IR index (%) as determined by dividing an absorbance at 1850 $cm^{-1}$ which is the absorption band characteristic of phthalic anhydride group in an infrared absorption spectrum on the PATE by an absorbance at 1900 $cm^{-1}$ which is the out-of-plane deformation overtone absorption band of CH and multiplying the resulting absorbance ratio by 100. If the IR index is lower than 2%, the effect of the phthalic anhydride groups introduced into the polymer becomes too little.

According to the production process of the present invention, a PATE containing phthalic anhydride groups can be provided as granules which can be captured on a screen of 100 mesh when they are sifted by the screen.

The phthalic anhydride group-containing PATEs according to the present invention are stable at usual processing temperatures of the PATEs and not decomposed by decarboxylation.

ADVANTAGES OF THE INVENTION

According to the present invention, it is possible to provide a granular PATE containing phthalic anhydride groups which are functional groups and good in heat stability. The production process of this invention permits the control of the content of the phthalic anhydride groups within a desired range and also can produce a PATE having a high molecular weight and containing phthalic anhydride groups.

In particular, the phthalic anhydride group-containing PATEs according to the production process of this invention have functional groups good in heat stability, so that they have an effect to allow to satisfactorily put the functional groups to good use, and can be used, for example, as alloy components with other resins or agents for improving the adhesion properties of fillers. The high-molecular weight PATEs containing phthalic anhydride groups are good in crystallinity and retain good physical properties inherent in PATE, such as heat resistance and chemical resistance because they have a phthalic anhydride group on at least one terminal thereof.

Since the phthalic anhydride group-containing PATEs obtained according to the production process of this invention are granular, they have the following advantageous effects in addition to an advantage that the separation and purification of the polymers upon their production become easy. Namely, the worsening of labor hygiene and environmental contamination due to flying of the fine powder upon its forming or molding and processing are improved, and the polymers have excellent handling properties.

The phthalic anhydride group-containing PATEs obtained in accordance with the production process of this invention can be used either singly or as blends with other resins in a wide variety of application fields, for example, as injection-molded products, extruded products, films, sheets, sealing materials, fibers, etc.

EMBODIMENTS OF THE INVENTION

The present invention will hereinafter be described specifically by the following examples and comparative example. It should however be borne in mind that this invention is not limited to the following examples only.

Incidentally, the following methods were followed for the measurement of the physical properties of polymers in the following examples.

(1) IR index of the content of phthalic anhydride groups:

With respect to a sheet obtained by hot-pressing each phthalic anhydride group-containing PATE sample at 320° C., and then putting the polymer sample thus hot-pressed into iced water to quench it, the infrared absorption spectrum according to the transmission method was measured by means of an "FT-IR 1760" manufactured by Perkin Elmer Company. From the spectrum thus obtained, an absorbance at 1850 cm$^{-1}$ which is the absorption band characteristic of phthalic anhydride group was divided by an absorbance at 1900 cm$^{-1}$ which is the out-of-plane deformation overtone absorption band of CH, and the quotient was expressed in terms of %.

(2) Melt viscosity:

The melt viscosity of each polymer sample was measured by a Capirograph (manufactured by Toyo Seiki Seisakusho, Ltd.) at 310° C. and a shear rate of 1,200 sec$^{-1}$.

(3) Melting point (Tm) and glass transition temperature (Tg):

The melting point and glass transition temperature of a sheet obtained by hot-pressing each polymer sample at 320° C., and quenching the polymer sample thus hot-pressed were measured by a differential scanning calorimeter (DSC) manufactured by Perkin Elmer Company at a heating rate of 10° C./min in a nitrogen atmosphere.

(4) Thermogravimetric analysis:

The thermogravimetric analysis on each polymer sample was conducted by a thermogravimetric analyzer (TGA) manufactured by Mettler Instrument AG at a heating rate of 20° C./min in a nitrogen atmosphere.

REFERENCE EXAMPLE 1

A titanium-lined autoclave was charged with 6700 g of N-methyl-2-pyrrolidone (NMP) and 3800 g [22.44 moles as S (sulfur) content] of hydrated sodium sulfide. After the autoclave being purged with nitrogen gas, 2527 g of an NMP solution, which contained 1436 g (79.79 moles) of water, and 0.453 mole of hydrogen sulfide were distilled off while gradually heating the contents to 200° C. The water content in the reaction system after the dehydration was 1.543 moles per mole of S content.

Then, 3395 g (23.09 moles) of p-dichlorobenzene and 2637 g of NMP were fed to react the contents at a temperature of 220° C. for 4.5 hours. At this stage, a small amount of a slurry formed in the polymerization reaction system was sampled out to determine an amount of remaining p-dichlorobenzene by a gas chromatography, thereby calculating the conversion of the monomers. As a result, the conversion was found to be 92%.

Next, 447.7 g (24.85 moles) of water was additionally introduced under pressure in the autoclave (Total water content: 2.63 moles per mole of S content). The contents were heated up to 255° C. to react them for 4.0 hours.

After the resultant reaction mixture was sifted by a screen of 100 mesh to separate a granular polymer formed, the polymer was washed three times with acetone, three times with water and further once with an aqueous HCl solution adjusted to pH 3. The thus-washed polymer was then washed further with water, dewatered and dried, thereby obtaining a granular polymer (Polymer R). The physical properties of Polymer R thus obtained were as follows:

Melt viscosity: 510 poises;

Tm: 282° C.; and

Tg: 84° C.

EXAMPLE 1

A titanium-lined autoclave was charged with 3200 g of NMP and 1351.1 g (8.00 moles as S content) of hydrated sodium sulfide. After the autoclave being purged with nitrogen gas, 1373.8 g of an NMP solution, which contained 543.1 g (30.15 moles) of water, and 0.17 mole of hydrogen sulfide were distilled off while gradually heating the contents to 200° C.

Then, 1116.5 g (7.595 moles) of p-dichlorobenzene, 1540.2 g of NMP and 32.7 g (1.82 moles) of water were fed to react the contents at a temperature of 220° C. for 4.5 hours. At this stage, a small amount of a slurry formed in the polymerization reaction system was sampled out to determine an amount of remaining p-dichlorobenzene, thereby calculating the conversion of the monomers. As a result, the conversion was found to be 91.5%.

Next, 282 g (15.67 moles) of water, 175.86 g (0.783 mole) of sodium hydrogen 4-chlorophthalate and 31.32 g (0.783 mole) of sodium hydroxide were additionally introduced under pressure in the autoclave. The contents were heated up to 255° C. to react them for 5 hours.

After the resultant reaction mixture was sifted by a screen of 100 mesh to separate a granular polymer formed, the polymer was washed three times with acetone, four times with water and further five times with an aqueous HCl solution adjusted with HCl to pH 3, and then dewatered and dried (at 110° C. for 8 hours), thereby obtaining a granular polymer (Polymer A) with a yield of 73%. The physical properties of Polymer A thus obtained were as follows:

IR index as to phthalic anhydride groups: 26.4%

Melt viscosity: 1340 poises;

Tm: 276° C.; and

Tg: 90° C.

Figure 2:
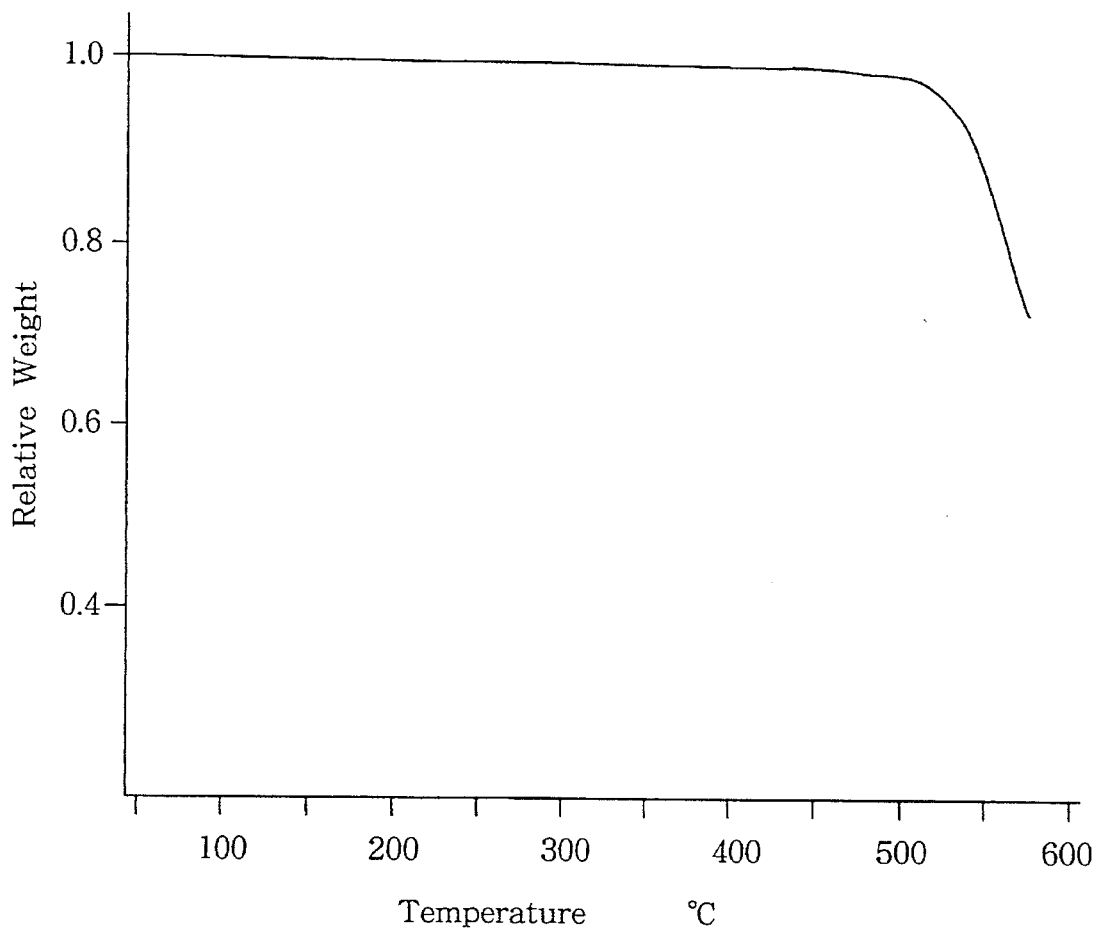
FIG. 2 is a diagram illustrating the results of thermogravimetric analysis on Polymer R obtained in Referential Example 1.

The results of thermogravimetric analysis on Polymer A are shown in FIG. 1. The results of thermogravimetric analysis on Polymer R obtained in Referential Example 1 are also shown in FIG. 2. As apparent from a comparison between FIGS. 1 and 2, the phthalic anhydride group-containing PATE (Polymer A) obtained in accordance with the process of this invention is good in heat stability though it contains phthalic anhydride groups. Its thermogravimetric curve is substantially the same as that of Polymer R containing no phthalic anhydride group.

EXAMPLE 2

A titanium-lined autoclave was charged with 8000 g of NMP and 3382.7 g (20.0 moles as S content) of hydrated sodium sulfide. After the autoclave being purged with nitrogen gas, 2555 g of an NMP solution, which contained 1406.3 g (78.06 moles) of water, and 0.49 mole of hydrogen sulfide were distilled off while gradually heating the contents to 200° C.

Then, 2838.9 g (19.31 moles) of p-dichlorobenzene, 2885.5 g of NMP and 129.3 g (7.18 moles) of water were fed to react the contents at a temperature of 220° C. for 4.5 hours. At this stage, a small amount of a slurry formed in the polymerization reaction system was sampled out to determine an amount of remaining p-dichlorobenzene, thereby calculating the conversion of the monomers. As a result, the conversion was found to be 90%.

Next, 527.2 g (29.29 moles) of water, 219.1 g (0.984 mole) of sodium hydrogen 4-chlorophthalate and 39.02 g (0.9755 mole) of sodium hydroxide were additionally introduced under pressure in the autoclave. The contents were heated up to 255° C. to react them for 5 hours.

Thereafter, an after-treatment was conducted in the same manner as in Example 1, thereby obtaining a granular polymer (Polymer B) with a yield of 67%. The physical properties of Polymer B thus obtained were as follows:

IR index as to phthalic anhydride groups: 6.5%

Melt viscosity: 2920 poises;

Tm: 276° C.; and

Tg: 91° C.

EXAMPLE 3

A titanium-lined autoclave was charged with 3200 g of NMP and 1351.1 g (8.00 moles as S content) of hydrated sodium sulfide. After the autoclave being purged with nitrogen gas, 1381.3 g of an NMP solution, which contained 535.9 g (29.75 moles) of water, and 0.16 mole of hydrogen sulfide were distilled off while gradually heating the contents to 200° C.

Then, 1118.6 g (7.61 moles) of p-dichlorobenzene, 1562.4 g of NMP and 24.7 g (1.37 moles) of water were fed to react the contents at a temperature of 220° C. for 4.5 hours. At this stage, a small amount of a slurry formed in the polymerization reaction system was sampled out to determine an amount of remaining p-dichlorobenzene, thereby calculating the conversion of the monomers. As a result, the conversion was found to be 93%.

Next, 212 g (11.77 moles) of water, 176.0 g (0.784 mole) of sodium hydrogen 4-chlorophthalate and 31.36 g (0.784 mole) of sodium hydroxide were additionally introduced under pressure in the autoclave. The contents were heated up to 255° C. to react them for 5 hours.

Thereafter, an after-treatment was conducted in the same manner as in Example 1, thereby obtaining a granular polymer (Polymer C) with a yield of 65%. The physical properties of Polymer C thus obtained were as follows:

IR index as to phthalic anhydride groups: 65.4%

Melt viscosity: 310 poises;

Tm: 279° C.; and

Tg: 87° C.

EXAMPLE 4

A titanium-lined autoclave was charged with 3200 g of NMP and 1351.1 g (8.00 moles as S content) of hydrated sodium sulfide. After the autoclave being purged with nitrogen gas, 1341 g of an NMP solution, which contained 562 g (31.19 moles) of water, and 0.18 mole of hydrogen sulfide were distilled off while gradually heating the contents to 200° C.

Then, 1138.4 g (7.74 moles) of p-dichlorobenzene, 1484.5 g of NMP, 52.69 g (0.234 mole) of sodium hydrogen 4-chlorophthalate, 12.51 g (0.3128 mole) of sodium hydroxide and 122.1 g (6.78 moles) of water were fed to react the contents at temperatures of 220° C., 230° C. and 240° C. each for 2.0 hours. Thereafter, 140.9 g (7.82 moles) of water was additionally introduced under pressure in the autoclave. The contents were heated up to 255° C. to react them for 3.5 hours.

Thereafter, an after-treatment was conducted in the same manner as in Example 1, thereby obtaining a granular polymer (Polymer D) with a yield of 75%. The physical properties of Polymer D thus obtained were as follows:

IR index as to phthalic anhydride groups: 27.6%

Melt viscosity: 990 poises;

Tm: 279° C.; and

Tg: 88° C.

EXAMPLE 5

A titanium-lined autoclave was charged with 6000 g of NMP, 3200 g (18.88 moles as S content) of hydrated sodium sulfide, 125.5 g (0.56 mole) of sodium hydrogen 4-chlorophthalate, 45.1 g (1.13 moles) of sodium hydroxide and 77.1 g (0.94 mole) of sodium acetate. After the autoclave being purged with nitrogen gas, 2798.4 g of an NMP solution, which contained 1306.7 g (72.5 moles) of water, and 0.405 mole of hydrogen sulfide were distilled off while gradually heating the contents to 200° C.

Then, 2661.5 g (18.11 moles) of p-dichlorobenzene, 2899.1 g of NMP and 93.8 g of water were fed to react the contents at a temperature of 220° C. for 4.5 hours. At this stage, a small amount of a slurry formed in the polymerization reaction system was sampled out to determine an amount of remaining p-dichlorobenzene, thereby calculating the conversion of the monomers. As a result, the conversion was found to be 91%.

Next, 832 g (46.2 moles) of water was additionally introduced under pressure in the autoclave. The contents were heated up to 255° C. to react them for 5 hours.

Thereafter, an after-treatment was conducted in the same manner as in Example 1, thereby obtaining a granular polymer (Polymer E) relatively even in particle size with a yield of 77%. The physical properties of Polymer E thus obtained were as follows:

IR index as to phthalic anhydride groups: 24.0%

Melt viscosity: 900 poises;

Tm: 277° C.; and

Tg: 89° C.

EXAMPLE 6

A titanium-lined autoclave was charged with 3200 g of NMP, 1351.1 g (8.00 moles as S content) of hydrated sodium sulfide, 53.9 g (0.24 mole) of sodium hydrogen 4-chlorophthalate and 9.6 g (0.24 mole) of sodium hydroxide. After the autoclave being purged with nitrogen gas, 1373.8 g of an NMP solution, which contained 543.1 g (30.15 moles) of water, and 0.17 mole of hydrogen sulfide were distilled off while gradually heating the contents to 200° C.

Then, 1139.5 g (7.75 moles) of p-dichlorobenzene, 1540.2 g of NMP and 32.7 g of water were fed to react the contents at a temperature of 220° C. for 4.5 hours. At this stage, a small amount of a slurry formed in the polymerization reaction system was sampled out to determine an amount of remaining p-dichlorobenzene, thereby calculating the conversion of the monomers. As a result, the conversion was found to be 91%.

Next, 211 g (11.7 moles) of water was additionally introduced under pressure in the autoclave. The contents were heated up to 255° C. to react them for 5 hours.

Thereafter, an after-treatment was conducted in the same manner as in Example 1, thereby obtaining a granular polymer (Polymer F) with a yield of 78%. The physical properties of Polymer F thus obtained were as follows:

IR index as to phthalic anhydride groups: 16.0%

Melt viscosity: 1000 poises;

Tm: 277° C.; and

Tg: 89° C.

COMPARATIVE EXAMPLE 1

A PATE ("FORTRON KPSW214", product of Kureha Chemical Industry Co., Ltd.) having a melt viscosity of about 1400 poises and phthalic anhydride were dry-blended with each other at a weight ratio of 98/2. The resulting blend was then extruded through a twin-screw extruder, "BT-30" at the maximum preset temperature of 310° C. to form pellets, thereby obtaining a melt-modified polymer a. The content of phthalic anhydride groups in the melt-modified polymer a was 119% in terms of the IR index.

Similarly, the same kind of PATE as that used above and sodium hydrogen 4-chlorophthalate were dry-blended with each other at a weight ratio of 98/2. The resulting blend was then extruded through the twin-screw extruder, "BT-30" at the maximum preset temperature of 310° C. to form pellets, thereby obtaining a melt-modified polymer b. The content of phthalic anhydride groups in the melt-modified polymer b was 29% in terms of the IR index.

The melt-modified polymers a and b, and Polymer F produced in Example 6 were subjected to a remelting treatment in NMP and subsequent determination of the amount of functional groups by IR analysis. More specifically, the individual polymer samples in amounts of 50 g were separately placed in a 1-liter autoclave. To each autoclave, 500 g of NMP, 30 g of water and 4 g of NaOH were added. After the autoclave being purged with nitrogen gas, the contents were heated from room temperature to 255° C. for about 1 hour to melt the polymer. The heating was stopped at once at the time the temperature of the contents reached 255° C. to cool the contents to 80° C. for about 1.5 hours while stirring them. After cooling the contents, a slurry taken out of the autoclave was sifted by a screen of 100 mesh to separate the polymer. The polymer was then washed three times with an aqueous NaOH solution (pH: 12.5) to remove phthalic acid extracted by the remelting in NMP and twice with an aqueous HCl solution (pH: 2) to convert salts in the form of an acid. The thus-treated polymer was dried and then formed into a sheet by hot-pressing at 320° C. and quenching. An infrared absorption spectrum of the thus-formed sheet was measured to determine the content of phthalic anhydride groups.

The IR indices of the melt-modified polymers a and b after the remelting treatment in NMP were both 0%. On the contrary, the IR index of Polymer F obtained in Example 6 according to the present invention was 12%. Namely, both modified polymers obtained by respectively blending PATE and phthalic anhydride, and PATE and sodium hydrogen 4-chlorophthalate and then melt-extruding the blends contained the phthalic anhydride groups. However, no infrared absorption band characteristic of phthalic anhydride was detected after they were subjected to the remelt-extracting treatment in NMP. The IR spectra on these polymers were the same as that of the unmodified PATE.

With respect to Polymer F according to the process of this invention on the other hand, it was clearly recognized that the phthalic anhydride groups are present even after the remelting treatment in NMP. It is therefore understood that the process of the present invention provides polymers favorably different in bonding strength to phthalic group from the modified polymers obtained by the mere mixing and melt-extruding process.

What is claimed is:

1. A process for the production of a granular poly(arylene thioether) containing phthalic anhydride groups wherein a dihalogen-substituted aromatic compound and an alkali metal sulfide are polymerized in a polar organic solvent containing water to produce the poly(arylene thioether), which comprises conducting the polymerization reaction under the following conditions:

(i) a monohalogen-substituted phthalic compound is provided in a polymerization reaction system, and a ratio, a/b of the number of moles, a of the charged dihalogen-substituted aromatic compound to the number of moles, b of the charged alkali metal sulfide is controlled within a range of 0.8<a/b<1;

(ii) the amount of the monohalogen-substituted phthalic compound is controlled within a range of 0.05–30 mole % based on the total amount of the dihalogen-substituted aromatic compound and the monohalogen-substituted phthalic compound; and (iii) the polymerization reaction is conducted in the following at least two steps:

First step:

A reaction is conducted in the presence of water in a proportion of 0.5–2.4 moles per mole of the charged alkali metal sulfide at a temperature of 150°–235° C. until a conversion of the dihalogen-substituted aromatic compound becomes 50–98 mole %.

Second step:

Water is added in such a manner that the water content becomes 2.5–7.0 moles per mole of the charged alkali metal sulfide, and the reaction mixture is heated up to a temperature of 245°–280° C. to continue the polymerization reaction. temperature of 245°–280° C. to continue the polymerization reaction.

2. The process as claimed in claim 1, wherein the monohalogen-substituted phthalic compound is added to the polymerization reaction system in the second step to continue the polymerization reaction.

\* \* \* \* \*